United States Patent [19]

Vail

[11] Patent Number: 4,607,887
[45] Date of Patent: Aug. 26, 1986

[54] ENCAPSULATED BOLSTER

[75] Inventor: Curtis F. Vail, Ann Arbor, Mich.

[73] Assignee: Hoover Universal, Inc., Ann Arbor, Mich.

[21] Appl. No.: 583,528

[22] Filed: Feb. 24, 1984

[51] Int. Cl.⁴ .................... B60N 1/06; A47C 7/02
[52] U.S. Cl. ........................... 297/452; 297/284; 297/459
[58] Field of Search ............... 297/452, 284, DIG. 1, 297/459

[56] References Cited

U.S. PATENT DOCUMENTS

| | | | |
|---|---|---|---|
| 3,669,498 | 6/1972 | Meyers et al. | 297/452 |
| 3,727,980 | 4/1973 | Tischler | 297/452 |
| 3,762,770 | 10/1973 | Tedesco et al. | 297/452 |
| 4,191,424 | 3/1980 | Mundell | 297/452 X |
| 4,337,931 | 7/1982 | Mundell et al. | 297/452 X |
| 4,370,000 | 1/1983 | Kazaoka et al. | 297/284 |

FOREIGN PATENT DOCUMENTS 2056850 3/1981 United Kingdom ............... 297/284

Primary Examiner—William E. Lyddane
Assistant Examiner—Peter R. Brown
Attorney, Agent, or Firm—Stephenson and Boller

[57] ABSTRACT

A seat system comprises an encapsulated bolster wherein the seat cushion and bolster are foamed as a unit with the two being connected by an integral joining portion of the foam. Hinge structure may be incorporated into the design to enhance the durability of the construction, foam being foamed onto the hinge structure. The seat cushion and bolster can be advantageously trimmed by extending the seat cover laterally from the seat cushion, over the integral joining portion, and over upwardly and laterally outwardly facing surfaces of the bolster. The cover is trimmed off adjacent a lower edge portion of the bolster where the trimming is concealed from view. Principles of the invention may be applied to various types of bolster systems.

14 Claims, 10 Drawing Figures

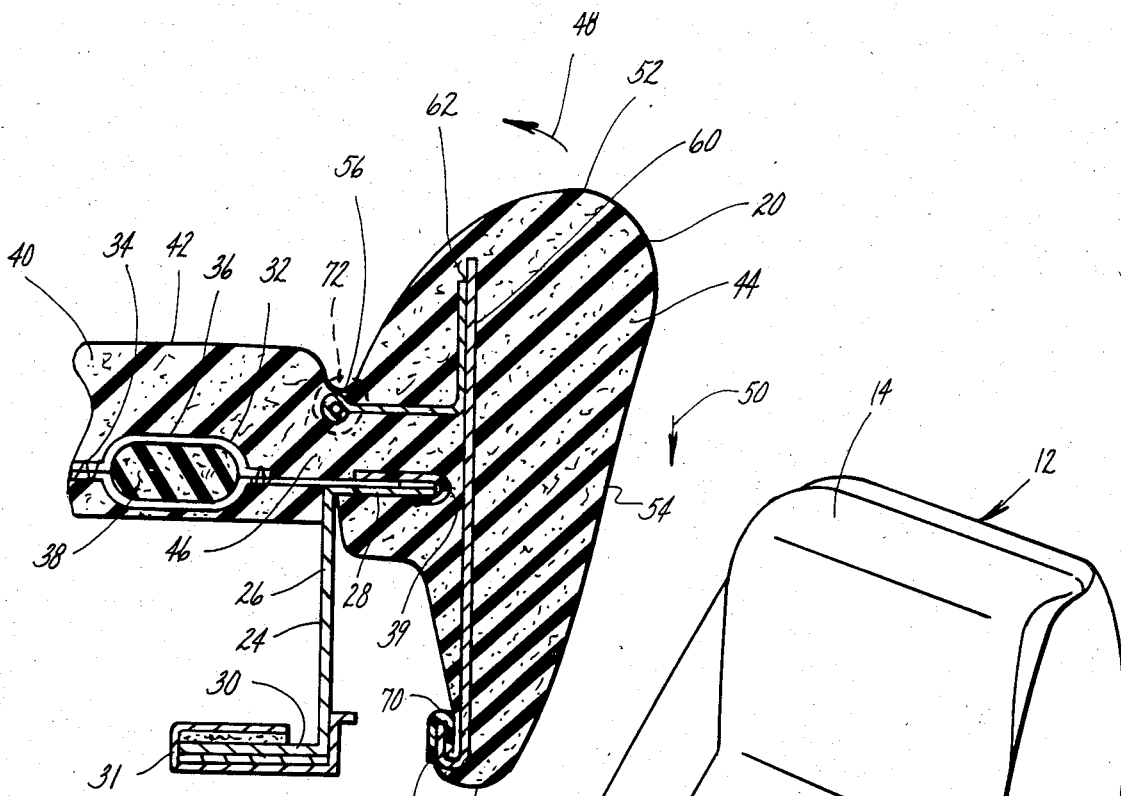
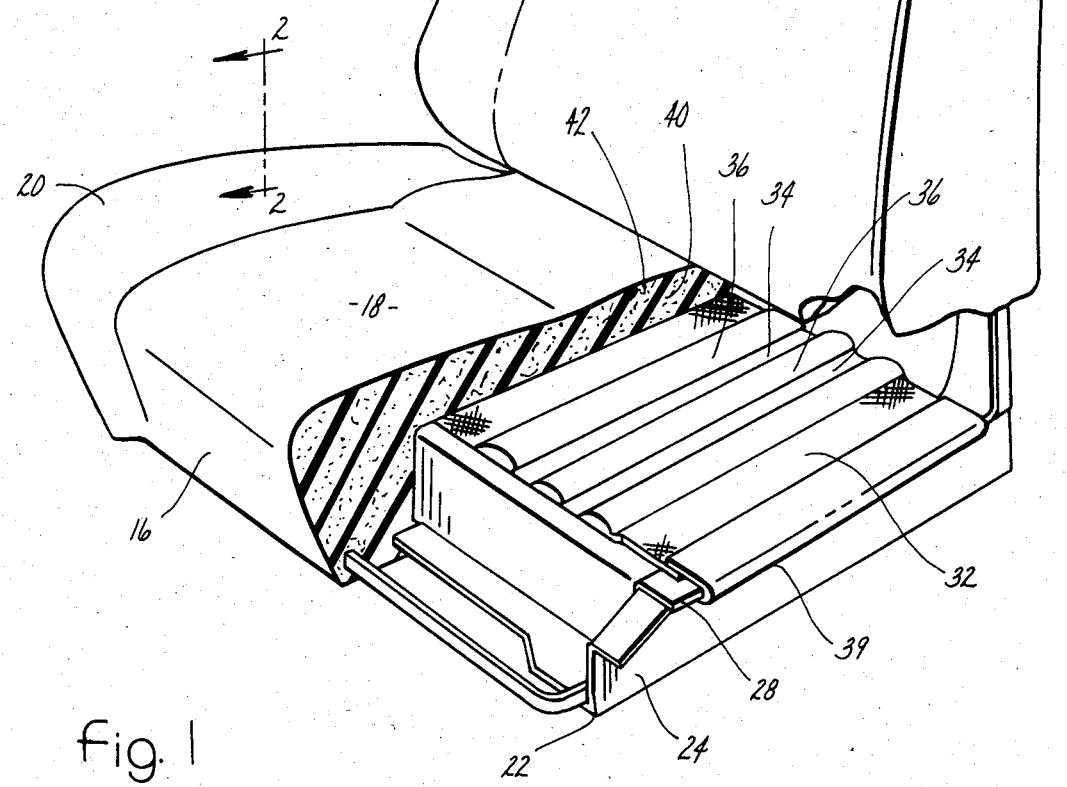

ENCAPSULATED BOLSTER

BACKGROUND AND SUMMARY OF THE INVENTION

This invention relates generally to seating systems and is particularly concerned with a seating system, especially useful for automotive vehicles, in which a seat is provided with one or more bolsters.

Bolsters are often utilized in seating systems to provide additional support for an occupant. Typically, bolsters are disposed on laterally opposite sides of the seat cushion to provide lateral support for an occupant, such as along hips and thighs.

In previous bolster designs, mechanical hinges have been used to mount bolsters on seat cushions to facilitate the effectiveness of the bolsters in providing lateral support. In other words when an occupant seats him or herself on the seat cushion, the weight of the occupant depresses the cushion, and the hinging action, or articulation, of the bolsters provides for the bolsters to be operated to laterally engage the hips and thighs of the seated occupant. In a motor vehicle where an occupant is subject to side forces when the vehicle turns, bolster-equipped seats provide extra seating comfort and stability.

Prior designs of this nature have had the bolsters as separate parts of the seat assembly. The bolsters are foamed and trimmed as individual units and then later assembled to the seat cushion. This type of design requires foam-free surfaces to allow hinging of the bolster units. Because additional assembly operations are required, additional manufacturing expenses are incurred.

The present invention is directed to a novel and unique construction for adjustable bolsters which utilizes an encapsulation concept wherein the mechanism which provides for the pivotal action of a bolster on a seat cushion is achieved by the integral formation of the bolster with the seat cushion. Stated another way, a body portion of the bolster is integrally foamed with a body portion of the seat cushion, and a joining portion of the foam, typically of reduced thickness, integrally joins the two body portions to provide a line of hinging via which the bolster can pivot with respect to the seat cushion. One result of the invention is that a more cost-effective construction results because there are less trimming and assembly operations required.

In order to provide enhanced durability for certain designs it is desirable to incorporate additional hinging structure within the foam material. Several forms of such hinging structure are contemplated and will be described in detail hereinafter. Such hinging structure is preferably fully encapsulated within the foam material. Benefits of such encapsulation include noise insulation. Less expensive material for the hinging structure can be used because it is not an appearance item.

The invention also provides for a new and unique way to trim a seat cushion and bolster wherein the seat covering material extends laterally from the seat cushion, over the joining portion which forms the hinge axis, and over upwardly and laterally outwardly facing surfaces of the bolster, and is finally trimmed off adjacent a lower edge portion of the bolster. This provides a wrinkle-free and non-stretch construction whereby wrinkling and stretching of the cover are substantially eliminated for bolster operation over its range of possible adjustment positions.

The construction is also advantageous in that the foam material has a certain return memory so that the as-foamed position defines the relative position which a bolster will inherently tend to assume with respect to a seat cushion. Yet the construction provides for ready adjustment of the bolster to and from this return position.

The invention also offers the opportunity for cooperative association of different mechanisms with a bolster. The present application discloses a completely passive bolster system. In other words the as-foamed position and the seat assembly's structural characteristics will determine the positions which the bolster assumes as a function of the physical characteristics of occupants. If necessary, additional means, springs for example, can be incorporated to coact with the bolsters. A bolster can also be adapted to a passive mechanical system in which it is passively adjusted by the occupant's body pressure but can be held in a desired position by a mechanical device.

Still further, the principles of the invention are well adapted to lightweight sturdy seat constructions by the particular relationship of the bolster and hinging mechanism in relation to an underlying base structure for the seat. Not only do functional improvements in this context accrue from the invention, but the construction also presents a pleasant finished appearance because the finishing of edges and the like may take place in concealed areas which are not exposed to view in normal use of the seat.

The foregoing features, advantages, and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

BRIEF DESCRIPTION OF THE DRAWINGS

FIG. 1 is a perspective view, having portions broken away, of a seat assembly embodying principles of the present invention.

FIG. 2 is a fragmentary cross sectional view, on an enlarged scale, taken in the direction of arrows 2—2 in FIG. 1.

DESCRIPTION OF THE PREFERRED EMBODIMENT

Figure 3:
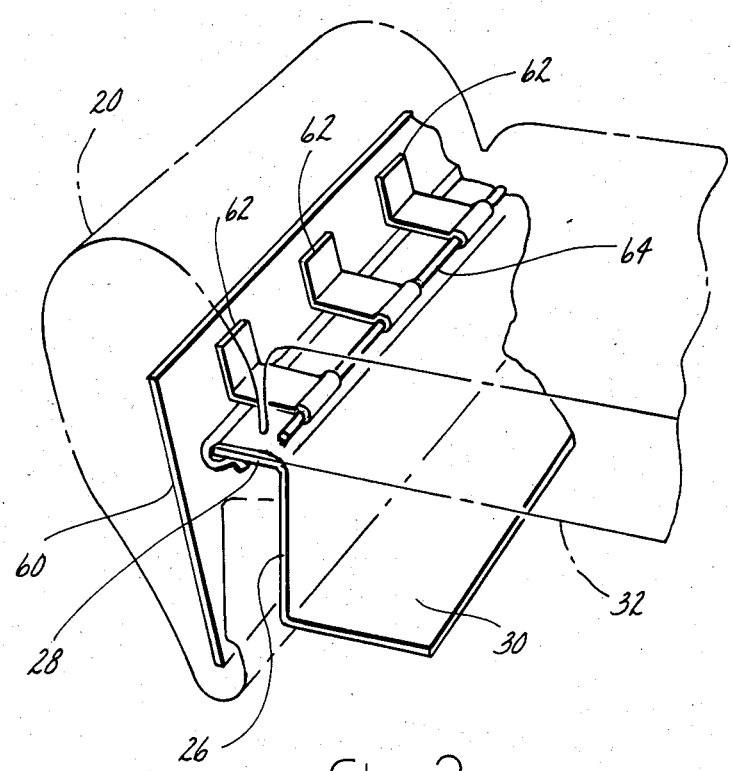
FIG. 3 is a fragmentary perspective view, partly in phantom, illustrating further details of FIG. 2.

FIG. 1 illustrates a representative seat assembly 12 embodying principles of the present invention. Seat assembly 12 comprises a back portion designated by the general reference numeral 14 and a seat portion designated by the general reference numeral 16.

Seat portion 16 comprises a main occupant seating area 18 and a pair of bolsters 20 on laterally opposite sides of seat area 18. It will be appreciated that only one of the bolsters 20 appears in FIG. 1 due to the fact that the near half of seat portion 16 has been partially sectioned away for illustrative purposes.

For purposes of explanation, let it be assumed that seat assembly 12 is intended to be the right hand passenger seat in an automotive vehicle so that the bolster 20 which is illustrated in FIG. 1 would be the outside bolster while the bolster which does not appear in FIG. 1 would be the inside bolster.

Considering now FIGS. 1, 2 and 3 in greater detail, the reader will see that seat portion 16 comprises a number of sub-assemblies. One of these sub-assemblies is a base 22 in the form of a generally rectangular frame. Base frame 22 comprises a pair of side rails 24 on lateral sides which extend fore and aft in the vehicle.

As appears best in FIG. 2, each of these side rails 24 is a stamped metal part which may be considered as having a "Z" cross section. The "Z" cross section is defined by a vertical web 26, an upper flange 28 and a lower flange 30. FIG. 2 illustrates lower flange 30 cooperatively associated with a vehicle-mounted track 31 whereby the seat may be adjusted fore and aft in the vehicle by moving base frame 22 fore and aft on track 31. Lower flange 30 of each rail 24 is directed in the inboard direction from web 26 toward seating area 18 while upper flange 28 extends from the top of its web 26 in the outboard direction. The terms "inboard" and "outboard" are referenced to the seating area.

Another one of the sub-assemblies is a load-supporting deck 32 which extends across the open top of base frame 22 between flanges 28. Deck 32 comprises a pair of sheets arranged in face-to-face relation comprising fore and aft extending seams 34 at lateral spacing distances to define fore and aft extending pockets 36 which are filled with foam 38 and arranged in a desired pattern to endow the seating area with certain characteristics for comfort of the occupant. The side edges of deck 32 are secured to flanges 28 by a suitable retention means which is illustrated in the drawing figures as a J-clip 39.

The seat area 18 comprises a foam body portion 40 which is constructed by molding of foam in place on the assembled sub-assemblies which have been just described. The foam medium may be any conventional material possessing the desired characteristics of moldability, stability and resilient support. The example of FIG. 1 illustrates the foam as fully covering the top of seat portion 16 and extending downwardly over the front of the base. If the foam medium 40 does not provide an integral skin, a cover 42 is applied over the foam to yield the desired outward appearance for the seat.

In accordance with principles of the present invention, bolsters 20 are constructed with body portions formed integrally with body portion 40 as part of the manufacturing procedure for manufacturing the seat. In this regard, attention is directed to FIG. 2 which illustrates a bolster as comprising a foam body portion 44 which integrally joins with body portion 40 along a joining portion 46. It will be observed that joining portion 46 has a reduced thickness so that it thereby defines a line of pivoting whereby bolster 20 can pivot in the sense indicated by the arrows 48 and 50 in FIG. 2 relative to body portion 40 of the seat.

It is deemed preferable to include insert structure within the foam medium to provide durability for the hinging action, although it will be appreciated that the inclusion of same is not always necessary in order to practice principles of the present invention.

Body portion 44 of bolster 20 may be considered as comprising a top surface 52 and a laterally outboard (relative to the seat area 18) surface 54. The top surface extends from the joining portion 46 at a groove 56 and may be considered as having a general semi-circular shape in cross section to where it merges into the laterally outboard surface 54. The laterally outboard surface continues from top surface 52 downwardly to a bottom surface portion 58. In cross section, the bolster may be considered as having a major dimension which is generally transverse to the lateral extent of the seat. A bolster insert 60 is disposed internally of body portion 44. This insert may take the form of a generally flat member, as shown, having a major dimension which is also generally transverse to the lateral extent of the seat when viewed in cross section as in FIG. 2.

Figure 4:
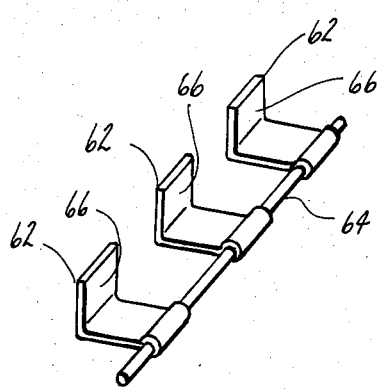
FIG. 4 is a perspective view illustrating a sub-assembly of FIG. 3 by itself.

The insert structure further comprises hinging structure which takes the form of a plurality of hinge brackets 62 cooperatively associated with member 60 and with a circular rod 64. Rod 64 is suitably supported on the base frame and extends lengthwise fore and aft. It is disposed in generally vertical alignment with and slightly above web 26. Brackets 62 are illustrated as having a generally right-angle shape. The distal end of one leg of each bracket 62 comprises an aperture through which rod 64 passes. As can be seen from consideration of FIGS. 3 and 4 these brackets are at intervals along the length of rod 64. The opposite leg 66 of each bracket is disposed against member 60 and suitably secured thereto in any conventional manner, such as welding or by fasteners.

The insert structure serves to better define the hinging action of the bolster on the seat by a more precise definition of the pivot axis. It will be observed that this insert structure is fully encapsulated by the foam material. Because of this, the foam material acts as a noise insulator to isolate any noise which might be created by the operation of the insert structure as the bolster is operated. It also enables these internal components to be constructed of less expensive materials since they are concealed from view and do not form finished appearance items.

According to a further aspect of the invention, it is possible to cover the foam material and finish trim the seat in a new and unique manner. The material of cover 42 extends laterally from seat area 18 fitting into groove 56 to cover joining portion 46. It continues on, covering the top and outboard surfaces 52, 54 of the bolster, as well as the bottom surface portion 58.

Insert member 60 is provided along its bottom edge with a reverse turned flange 68. Cover 42 is trimmed off at this flange, and the cover marginal edge is secured in place by any suitable means for example, by means of one or more clips 70 which hold the cover on the flange. It will be observed that the construction is such that the finishing of the cover along this bottom edge of the bolster is concealed from view in normal use of the seat, a desirable attribute from the standpoint of appearance.

It may also be desirable to include a further attachment of the cover in the vicinity of joining portion 46. This can be done for example by means of one or more tie-downs 72 which are shown extending from the cover through the foam material and into the joining portion 46. The example of FIG. 2 illustrates such a tie down extending around rod 64.

The illustrated construction is further advantageous in that the foam material can extend upwardly from the bottom edge of the bolster, along the inboard face of the member 60 to have a cooperative association with flange 28, the marginal edge of deck 32 and J-clip 39. FIG. 2 illustrates the foam encapsulating this projecting flange structure along the top and bottom.

The encapsulation of the elements 28, 32 and 39 by the foam material provides an integrated construction for the assembly, yet the action of the bolster is not impaired in any significant way because of the resiliently compressible and expansible nature of the foam material. Moreover, any deformation of the foam does not result in any significant change in volume, and stretching and wrinkling of the cover are also essentially eliminated by this design. It will be appreciated that the drawing figures illustrate representative constructions and shapes. Other shapes and constructions may be developed to embody principles of the invention.

Figure 5:
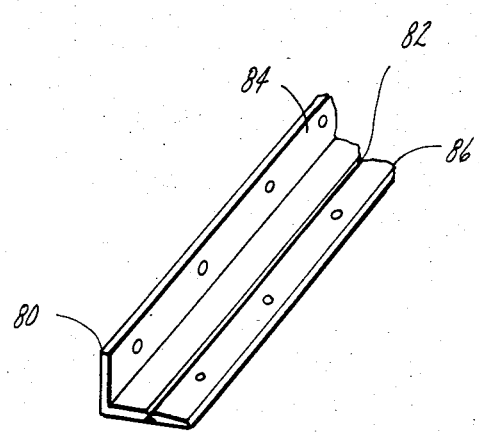
FIG. 5 is a perspective view illustrating an alternate form for the subassembly of FIG. 4.

By way of example, FIG. 5 illustrates an alternative construction for the hinge insert structure. In this drawing figure, the hinge insert structure comprises a plastic material 80 which is formed to provide a reduced thickness portion 82, commonly known as a living hinge. The portion 84 attaches to the insert member 60. The other portion 86 may be encapsulated within the seat cushion foam portion, and optionally secured to additional structure mounted on base frame 22.

Figure 6:
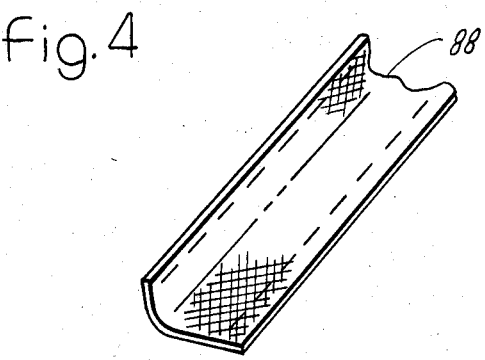
FIG. 6 is a perspective view illustrating still another form for the subassembly of FIG. 4.

FIG. 6 illustrates still another construction in which the hinge insert structure 88 is constructed of a fabric-like plastic, "Tiepar" for example.

Figure 7:
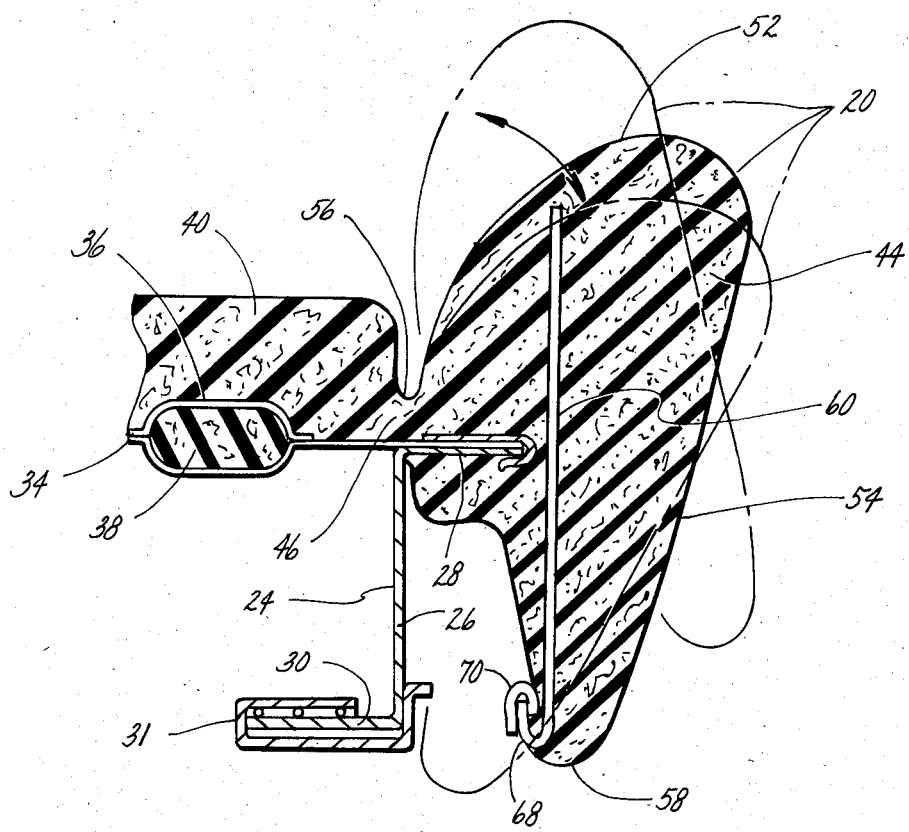
FIG. 7 is a view similar to FIG. 2 illustrating another embodiment, including different positions of adjustment.

FIG. 7 illustrates another form of seat assembly embodying principles of the present invention. Components in FIG. 7 corresponding to those of the previous figures are identified by like reference numerals and will not be described again in detail.

The principal difference between the embodiment of FIG. 7 and that of the preceding figures is that the hinge insert structure is omitted. In other words, it is solely the joining portion 46 which provides the hinging action of the bolster on the seat. It will also be observed that the thickness of the joining portion 46 is different in FIG. 7 than in FIG. 2. This is to demonstrate that the thickness of the joining portion will depend upon the characteristics of the particular foam material involved and the hinging requirements for the bolster. The material of the foam will have a resilient characteristic allowing it to conform to the articulation about joining portion 46.

The trimming of the cover is the same. Because the volume of the bolster will not be subject to any appreciable change as it is articulated, the bolster covering, although being integral with the seat covering, will nonetheless be wrinkle-free and stretch-resistant over the range of articulation of the bolster.

Figure 8:
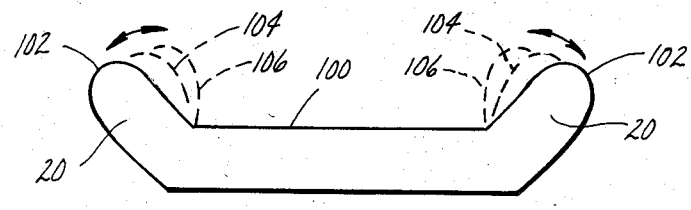
FIG. 8 is a diagrammatic view illustrating one type of seating system embodying principles of the invention.
Figure 9:
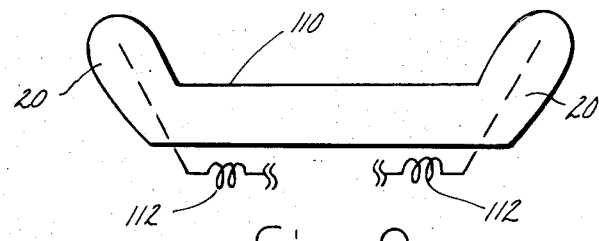
FIG. 9 is a diagrammatic view illustrating another type.
Figure 10:
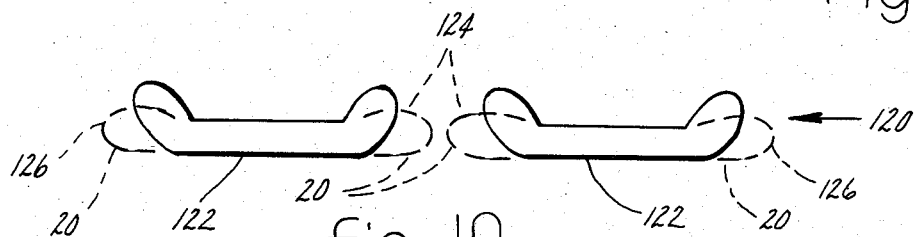
FIG. 10 is a diagrammatic view illustrating a third type.

FIGS. 8, 9, and 10 diagrammatically illustrate application of principles of the invention to different types of bolster systems.

FIG. 8 is a seat assembly 100 which incorporates a completely passive bolster system. In this system, bolsters 20 tend to inherently assume the as-foamed position which is depicted in solid lines 102. When an occupant sits upon the seat, the bolsters are deflected inwardly, such as to the positions indicated by the respective reference numerals 104, 106. These two positions 104, 106 represent different degrees of pivoting of the bolsters and the extent of pivoting will be a function of the physical characteristics of the seat and those of the occupant.

FIG. 9 illustrates application of principles of the invention to a mechanical bolster system. This embodiment illustrates a pair of springs 112 which are connected with the respective bolsters 20. The springs mechanically modify the articulation characteristics of the bolsters. Additional mechanisms, such as releasable latches or the like, may also be associated with the seat to lock the bolsters in desired positions.

FIG. 10 illustrates application of principles of the invention to a seating system 120 which contains two side-by-side seats 122. When each inside bolster 20 is operated to the broken line position 124 the total seating area is effectively expanded. In other words the two seats are converted into a capacity for seating more than two individuals. The outside bolsters may also be operated to broken line positions 126 as well. The arrangement is both functional and attractive in appearance.

Although several illustrative seating systems have been depicted, it will be appreciated that these are merely representative of certain applications of principles of the invention.

While a preferred embodiment of the invention has been disclosed, it will be appreciated that principles are applicable to other embodiments.

What is claimed is:

1. In a seat assembly having a base frame and a seat cushion providing an occupant seating surface and a lateral support bolster along a lateral side of said occupant seating surface to provide lateral support for a seated occupant, the improvement which comprises said seat cushion and said bolster comprising a continuous foam medium encapsulating a portion of said frame and forming a body portion of said bolster and a body portion of said seat cushion, said medium having a joining portion defining a line of pivoting between said two body portions so that said bolster can pivot via said joining portion relative to said seat cushion, said bolster including insert structure internal of said body portion of said bolster and separate from said frame, said bolster and its insert structure having a major dimension disposed generally transversely to the lateral extent of said seat cushion, said bolster having top, laterally outboard and bottom surface portions, said seat assembly further including a cover overlying said seat cushion and extending outwardly laterally thereof to also overlie said joining portion and said top, laterally outboard and bottom surface portions of said bolster, said insert structure having a bottom edge portion adjacent said bottom surface portion which is exterior of said bolster body portion, said cover having an edge terminating at said bottom edge portion of said insert structure, and securement means securing said cover edge to said bottom edge portion of said insert structure.

2. The improvement set forth in claim 1 in which said additional structure bottom edge portion comprises a flange, said cover edge being cooperatively associated with said flange, and said securement means comprising retention clip means for securing said cover edge on said flange.

3. The improvement set forth in claim 1 including attachment means securing said cover to said joining portion 4. The improvement set forth in claim 1 in which said seat assembly further includes hinge insert structure wholly disposed within the interior of said medium to provide reinforcement for the hinging action of said joining portion.

5. The improvement set forth in claim 4 in which said hinge insert structure comprises a rod which is arranged along said joining portion coaxial with the line of pivoting and at least one hinge member pivoted on said rod and extending into said body portion of said bolster.

6. The improvement set forth in claim 4 in which said hinge insert structure comprises a fabric-type plastic material which functions as a hinge.

7. The improvement set forth in claim 1 further including hinge insert structure disposed within said medium, said hinge insert structure comprising a hinge member operable about a hinge axis within said joining portion coaxial with the line of pivoting, and said hinge member extending laterally away from said seat cushion to connect with said insert structure within said bolster.

8. The improvement set forth in claim 7 including attachment means for securing said cover to said hinge insert structure at its hinge axis.

9. The improvement set forth in claim 1 in which said bolster insert structure comprises a generally flat member and said bottom edge portion thereof comprises a reverse turned flange turned onto the laterally inboard side of said member, said securement means being operative to secure said cover to said flange.

10. The improvement set forth in claim 1 in which said base frame includes a vertical web which is disposed in general vertical alignment with and below said joining portion.

11. The improvement set forth in claim 10 in which said base frame includes a laterally outwardly extending flange means extending laterally outwardly from the top edge of said vertical web, said flange means having top and bottom surface portions, said body portion of said bolster also fitting onto said top and bottom surface portions of said flange means.

12. The improvement set forth in claim 11 in which said body portion of said bolster and said flange means are so construced and arranged that said body portion of said bolster encapsulates the entire top surface of said flange means and at least a portion of the bottom surface of said flange means.

13. The improvement set forth in claim 11 in which said flange means comprises an integral flange integrally formed with said web, and said seat cushion comprises an edge portion of additional cushion structure internal of said seat cushion and including securement means for securing a laterally outboard edge portion of said additional cushion structure to said flange.

14. In a seat assembly having a seat cushion providing an occupant seating surface and a lateral support bolster along a lateral side of said occupant seating surface to provide lateral support for a seated occupant, the improvement which comprises said seat cushion and said bolster comprising a continuous foam medium forming a body portion of said bolster and a body portion of said seat cushion, said medium having a joining portion defining a line of pivoting between said two body portions so that said bolster can pivot via said joining portion relative to said seat cushion, hinge insert structure wholly disposed within the interior of said medium to provide reinforcement for the hinging action of said joining portion, said hinge insert structure comprising a one-piece molded plastic element having flanges joining together along a common web of thinness which forms a hinge between the two flanges, said web being coaxial with the line of pivoting.

* * * * *